(12) United States Patent
Huang

(10) Patent No.: US 12,662,867 B2
(45) Date of Patent: Jun. 23, 2026

(54) COMPOSITE DRIVING MECHANISM FOR VEHICLE AND VEHICLE EQUIPPED WITH THE SAME

(71) Applicant: Volvo Car Corporation, Gothenburg (SE)

(72) Inventor: Yang Huang, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/947,115

(22) Filed: Nov. 14, 2024

(65) Prior Publication Data

US 2025/0179857 A1     Jun. 5, 2025

(30) Foreign Application Priority Data

Dec. 1, 2023    (CN) .......................... 202311643037.1

(51) Int. Cl.
| | |
|---|---|
| *E05F 15/689* | (2015.01) |
| *B60J 1/17* | (2006.01) |
| *E05B 81/20* | (2014.01) |

(52) U.S. Cl.
CPC ............. *E05F 15/6896* (2024.01); *B60J 1/17* (2013.01); *E05B 81/20* (2013.01); *E05Y 2201/716* (2013.01); *E05Y 2900/55* (2013.01)

(58) Field of Classification Search
CPC ... E05F 15/6899; E05F 15/689; E05F 15/697; E05B 81/13

(Continued)

(56) References Cited

U.S. PATENT DOCUMENTS 4,381,625 A * 5/1983 Andrei-Alexandru ......................
E05F 15/689
49/72
4,478,004 A * 10/1984 Andrei-Alexandru ......................
E05F 11/382
49/72

(Continued)

FOREIGN PATENT DOCUMENTS

| EP | 1426531 A1 * | 6/2004 | ............ E05F 15/689 |
|---|---|---|---|
| EP | 1570148 B1 | 2/2010 | |
| KR | 1020170139345 A * | 12/2017 | ................ B60J 1/17 |

OTHER PUBLICATIONS

Machine translation of KR1020170139345A.*

(Continued)

*Primary Examiner* — Marcus Menezes

(74) *Attorney, Agent, or Firm* — Clements Bernard Walker; Christopher L. Bernard

(57)     ABSTRACT

A composite driving mechanism for a vehicle including: a drive device for providing a driving force; a lifting drive assembly to transmit the driving force to a lifting mechanism; a cinching drive assembly to transmit the driving force to a cinching mechanism; and a switch assembly to engage with the drive device and selectively switch between a lifting drive position, in which the switch assembly only transmits the driving force to the lifting drive assembly, and a cinching drive position, in which the switch assembly only transmits the driving force to the cinching drive assembly. The switch assembly is located between the lifting drive assembly and the cinching drive assembly and separates them from each other. The composite driving mechanism has little impact on occupied spaces inside a door mechanism, vehicle assembly cost, and waterproof requirements of the mechanism, and does not significantly affect the sound performance of the vehicle.

19 Claims, 7 Drawing Sheets

(58) Field of Classification Search
USPC ........................................................ 49/280
See application file for complete search history.

(56)                     References Cited

U.S. PATENT DOCUMENTS

| 7,891,138 | B2 * | 2/2011 | Ottino | ..................... E05B 81/25 |
| | | | | 49/141 |
| 2006/0254144 | A1 | 11/2006 | Ottino | |

OTHER PUBLICATIONS

Machine translation of EP-1426531-A1.*
Mar. 26, 2025 European Search Report issued in corresponding EP Application No. 24213775.

* cited by examiner

COMPOSITE DRIVING MECHANISM FOR VEHICLE AND VEHICLE EQUIPPED WITH THE SAME

CROSS-REFERENCE TO RELATED APPLICATION

This application claims priority to CN application Ser. No. 202311643037.1, titled "COMPOSITE DRIVING MECHANISM FOR VEHICLE AND VEHICLE EQUIPPED WITH THE SAME", filed on Dec. 1, 2023, which is hereby incorporated by reference.

TECHNICAL FIELD

The present invention relates to a driving mechanism for a vehicle, and specifically to a composite driving mechanism for driving a window to lift up and down and thus achieving an automatic cinch of a door.

BACKGROUND

In current vehicle designs, it is usually necessary to provide the door with an automatic (electric) cinching function to improve safety and comfort of the vehicle. In order to achieve this function, a current design scheme is to provide a set of cinching drive mechanism for locking the door (especially a side door). However, after the set of cinching drive mechanism is provided, a series of problems will usually arise:

Firstly, the provision of the cinching drive mechanism will necessarily increase assembly complexity and inevitably require to occupy more spaces in door structures to accommodate the mechanism.

Secondly, the set of cinching drive mechanism includes a plurality of components such as a motor, gears and a housing, resulting in a significant increase in the number of parts used for assembling the vehicle (especially the door) and inevitably increasing the overall assembly cost.

Thirdly, according to the current vehicle design, the cinching drive mechanism can only be provided on a wet side of the door, inevitably resulting in the problem in terms of waterproofing in the mechanism. Such design must meet the IP67 waterproof requirement, thereby increasing the level of waterproof requirements in the design and the associated cost and space requirements.

Fourthly, during the operation of the cinching drive mechanism, a motor and a gear chain are required to provide high torques, and therefore, the motor speed will be very high. It will inevitably generate a certain amount of noise, thereby affecting the sound performance of the vehicle and thus reducing its comfort.

Therefore, there is a need in the field to provide an improved driving mechanism that can minimize the space occupied by the mechanism inside the door, would not excessively increase the assembly cost of the vehicle, have low waterproof requirements, and/or will not significantly affect sound performance of the vehicle.

BRIEF SUMMARY

In order to achieve one or more of the above objects, the present invention provides a composite driving mechanism for a vehicle. The composite drive mechanism for a vehicle, comprising: a drive device configured to provide a driving force; a lifting drive assembly configured to transmit the driving force to a lifting mechanism of the vehicle to achieve a lifting function of a window of the vehicle; a cinching drive assembly configured to transmit the driving force to a cinching mechanism of the vehicle to achieve a cinching function of a door of the vehicle; and a switch assembly configured to engage with the drive device and be capable to be selectively switched between a lifting drive position, in which the switch assembly only transmits the driving force to the lifting drive assembly, and a cinching drive position, in which the switch assembly only transmits the driving force to the cinching drive assembly. Wherein the switch assembly is located between the lifting drive assembly and the cinching drive assembly and separates them from each other.

Further, the lifting drive assembly, the cinching drive assembly and the switch assembly are axially connected via a positioning member such that the switch assembly, the lifting drive assembly and the cinching drive assembly can rotate around the common axis, the positioning member being positioned along a common axis shared by the switch assembly, the lifting drive assembly and the cinching drive assembly.

According to an embodiment of the invention, the switch assembly comprises a ring gear and a transmission member. The ring gear comprising: a plurality of external teeth provided on an outer peripheral wall of the ring gear and configured to engage with threads on a drive shaft of the drive device such that the ring gear can rotate around the common axis under the action of the driving force; a partition wall extending perpendicularly to the common axis and provided with a central matching through-hole; and a plurality of internal teeth provided on an inner peripheral wall of the ring gear located on a side of the partition wall, and configured to engage with the cinching drive assembly. The transmission member provided through the central matching through-hole and capable to move axially along the common axis under the action of the switching drive assembly, wherein when the switch assembly is in the lifting drive position, the transmission member can simultaneously engage with the ring gear and the lifting drive assembly to transmit the driving force to the lifting drive assembly via a rotation of the ring gear, and when the switch assembly is in the cinching drive position, the transmission member can be disengaged from the ring gear and thus cannot receive a power transmission from the ring gear.

Further, the partition wall is flush with an axial side of the ring gear; or the partition wall divides an internal space of the ring gear into a first space and a second space, and the plurality of internal teeth are arranged in one of the first space and the second space, while the other of the first space and the second space is configured to receive a portion of the lifting drive assembly.

Alternatively, the transmission member comprises a retaining ring extending radially outward from an outer surface of the transmission member and perpendicularly to the common axis, thereby dividing the transmission member into a first rod portion and a second rod portion; wherein the first rod portion is configured to pass through the central matching through-hole of the ring gear, and a connection structure extending radially outward and away from the common axis is provided on an outer peripheral wall of the first rod portion at an end thereof away from the ring gear and is configured to engage with a matching structure provided at the central matching through-hole, the connection structure has an axial length sufficient to enable the first rod portion to simultaneously engage with the central matching through-hole and the lifting drive assembly, when the switch assembly is in the lifting drive position, and the connection structure is separated from the ring gear by an axial distance sized such that when the switch assembly is in the cinching drive position, the connecting structure and the matching structure are disengaged from each other.

Further, the connecting structure is one of a connecting key and a matching keyway, and the matching structure is the other of the connecting key and the matching keyway.

Further, the composite driving mechanism further comprises a housing configured to accommodate the drive device, the switch assembly, at least a portion of the lifting drive assembly and the cinching drive assembly.

According to an another embodiment of the invention, the switching drive assembly comprises: a switching drive device fixed relative to the housing, wherein a switching drive shaft of the switching drive device is provided with drive teeth; and switching drive member configured to axially abut against the second rod portion of the transmission member. The switching drive member is provided with: a translation through-hole extending along a biasing axis, parallel to the common axis, of the switching drive member, and the switching drive member configured to be capable to move axially along a positioning column, via the translation through-hole to be fit on the positioning column, the positioning column being fixed relative to the housing and extending along the biasing axis; engagement teeth provided on a side of the switching drive member and configured to engage with the drive teeth of the switching drive device such that the switching drive member can move axially along the common axis under the action of the switching drive device, and then drive the transmission element to move axially; and an assembly positioning through-hole configured to allow the positioning member to pass through to achieve an assembly positioning.

According to a further embodiment of the invention, the switching drive assembly comprises: a switching drive device fixed relative to the housing, wherein driving threads are provided on a switching drive shaft of the switching drive device; and a switching drive member. The switching drive member comprises: teeth portion provided with a central positioning hole, which extends along a biasing axis parallel to the common axis and is fit on a positioning column fixed relative to the housing and extending along the biasing axis, wherein transmission teeth are provided on an outer peripheral wall of the teeth portion and configured to engage with the driving threads of the switching drive device such that the switching drive member can rotate around the positioning column under the driving action of the switching drive device; and a cam portion connected to or integral with the gear portion along the biasing axis, wherein a chamfered surface is provided on a side of the cam portion away from the gear portion and configured to abut against an axial side of the transmission member such that the axial side can slide on the chamfered surface when the switching drive member rotates, thereby achieving the axial movement of the transmission member along the biasing axis.

According to a yet further embodiment of the invention, the lifting drive assembly comprises a lifting drive member and a sleeve. The lifting drive member comprises: a central lifting through-hole extending through the lifting drive member along the common axis and configured to receive and engage with the first rod portion to receive the driving force transmitted via the ring gear; and a lifting teeth portion provided on an end of the lifting drive member away from the ring gear, wherein lifting drive teeth are provided on an outer peripheral wall of the lifting teeth portion and used for engaging with a window lifting mechanism of the vehicle to transmit the driving force from the ring gear. The sleeve is provided with a receiving groove configured to receive the lifting gear portion such that receiving teeth provided on an inner peripheral wall of the receiving groove can engage with lifting drive teeth on the lifting teeth portion, and the sleeve is configured to match with the window lifting mechanism to transmit the driving force from the drive device to the window lifting mechanism.

Further, the central lifting through-hole is provided with a matching structure which is the same as that of the central matching through-hole; and/or the lifting gear portion has an axial length equal to or slightly greater than (put another way, not less than) that of the receiving groove of the sleeve to which the lifting gear portion is to be matched.

Further, an elastic member is provided between the first rod portion and the lifting drive member to provide an elastic force directed along the common axis between them.

Further, the central lifting through-hole of the lifting drive member is a stepped hole, and the transmission member is provided with a central transmission through-hole also in the form of a stepped hole, the elastic member has an end provided in the central transmission through-hole and the other end provided in the central lifting through-hole.

According to an embodiment of the invention, the cinching drive assembly comprises a cinching drive member and a flexible connecting member. The cinching drive member configured to tend to be remained in an initial radial position relative to the housing under the action of a reset elastic member and to form an axial abutment between the cinching drive member and the transmission member of the switching assembly, and comprising: a central cinching through-hole provided along the common axis through the cinching drive member, which is configured to be fit on the second rod portion of the transmission member via the central cinching through-hole and axially abut against the retaining ring of the transmission member; a cinching teeth portion located at a first axial end of the cinching drive member in proximity to the cinching drive member, wherein a plurality of cinching drive teeth are provided on an outer peripheral wall of the cinching teeth portion and configured to engage with the plurality of internal teeth of the ring gear, when the switch assembly is in the cinching drive position, so as to receive the driving force transmitted via the ring gear. The flexible connecting member has an end fixedly connected to the cinching drive member, and the other end fixedly connected to the cinching mechanism of the vehicle, and when the cinching drive assembly is in the initial radial position, the flexible connecting member is in a critical state.

Further, the cinching drive member is further provided with an annular recess arranged around the central cinching through-hole on a second axial end of the cinching drive member opposite to the first axial end; and the reset elastic member is in the form of a torsion spring, and is arranged within the annular recess around the central cinching through-hole, and has an end fixed to the housing, and the other end fixed to the cinching drive member.

Alternatively, the cinching drive member is further provided with a stop extending, on the second axial end, parallelly to the common axis from an outer peripheral wall of the annular recess, and configured such that when the cinching drive member is in the initial radial position, a side of the stop along a circumferential direction of the cinching drive member abuts against the housing.

Further, the stop abuts against a stop matching portion protruding towards an inner side of the housing and provided on an inner wall of the housing.

Alternatively, a circumferential groove is provided on the outer peripheral wall of the cinching drive member and runs along a circumferential direction of the cinching drive member, and the flexible connecting member is provided within the circumferential groove.

Further, the circumferential groove has a circumferential length accounting for at least ¾ of the entire circumferential length of the cinching drive assembly.

The present invention also provide a vehicle comprising at least one door each equipped with the aforementioned composite driving mechanism.

With the composite driving mechanism for a vehicle and the vehicle equipped with the same provided by the present invention, it will have little effect on the space occupied by the mechanism inside the door, the assembly cost of the vehicle, and requirements for waterproof performance of the mechanism, and will not significantly affect sound performance of the vehicle, thereby ensuring the safety and comfort of the vehicle.

DETAILED DESCRIPTION

Figure 1:
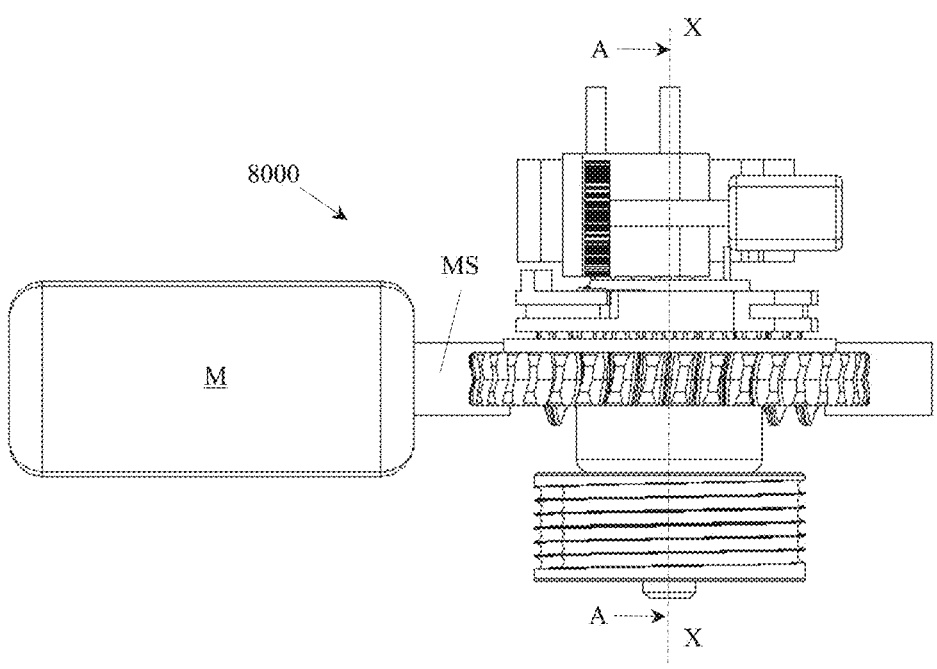
FIG. 1 shows a front assembly view of a composite driving mechanism according to the present invention.

The composite driving mechanism for a vehicle of the present invention will be described in detail with reference to accompanying drawings. It should be noted that schemes and structures shown in the accompanying drawings are only exemplary and/or illustrative, and the present invention is not intended to be limited thereto. In the accompanying drawings, similar reference numerals will be used to indicate similar components. The drawings as provided are only exemplary, and various figures and components within each figure may not necessarily be drawn to scale.

In the following description of the present invention, the term "axial length" refers to a length along an axis direction, the term "cross section" refers to a section taken perpendicularly to the axis direction, and the term "circumferential length" refers to a length along a circumferential direction around an axis.

Figure 2:
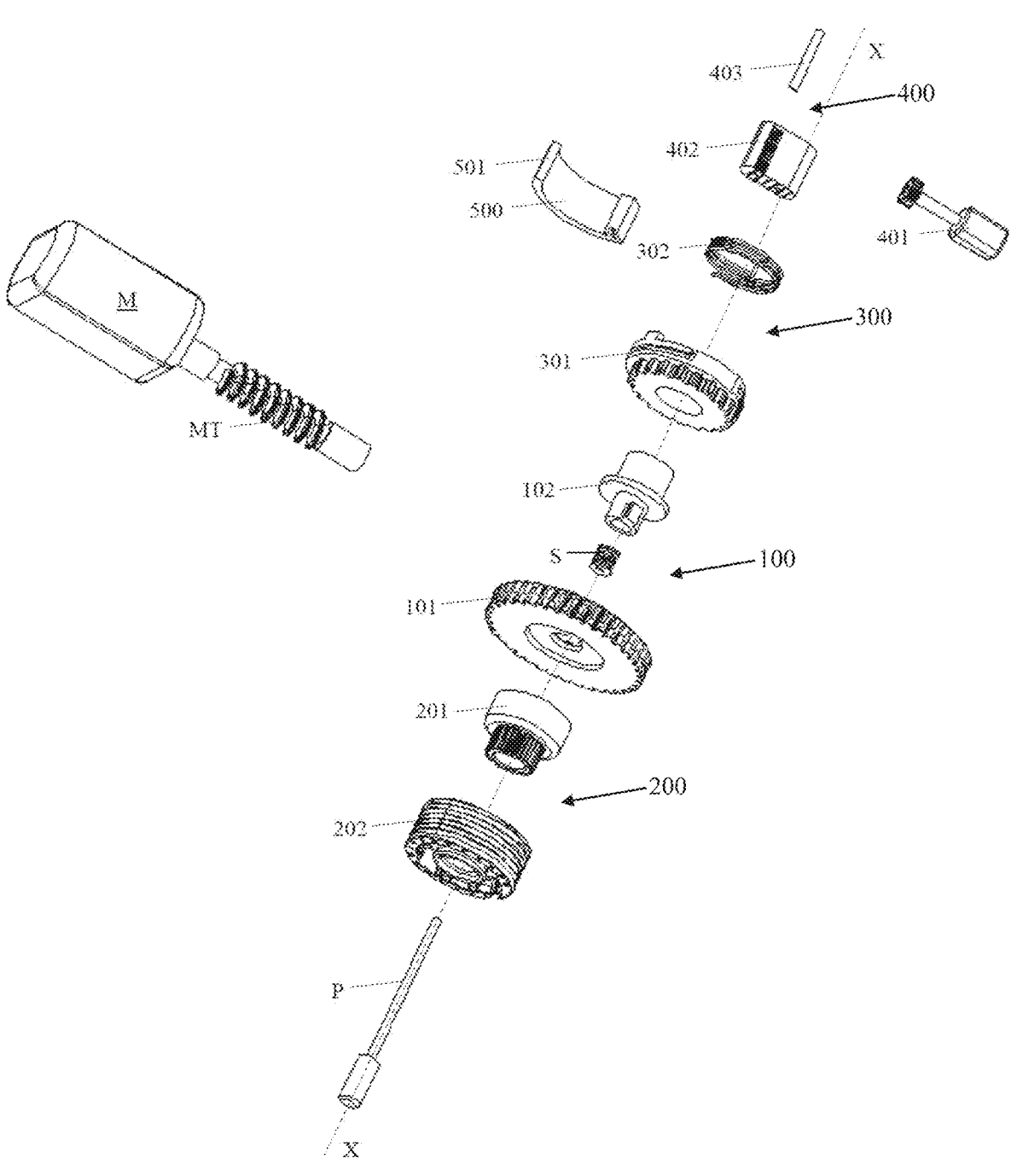
FIG. 2 shows a bottom exploded perspective view of the composite driving mechanism shown in FIG. 1.

FIGS. 1 and 2 are a front assembly view and a bottom exploded perspective view of the composite driving mechanism according to the present invention, respectively.

The composite driving mechanism 8000 according to the present invention generally includes a drive device M, a switch assembly 100, a lifting drive assembly 200, a cinching drive assembly 300, a switching drive assembly 400 and a housing 500. Among them, the lifting drive assembly 200, the switch assembly 100, the cinching drive assembly 300 and the switching drive assembly 400 are sequentially and coaxially installed together via a positioning member P in the form of a positioning pin, and define a common axis X-X.

The drive device M can be in the form of an electric motor, and used to power the entire composite driving mechanism. The drive device M includes a drive shaft MS extending from a side of a drive device body (not labeled) thereof, and the drive shaft MS has threads MT provided thereon. A connection relationship between the drive device M and other components will be described in detail below.

Figure 3A:
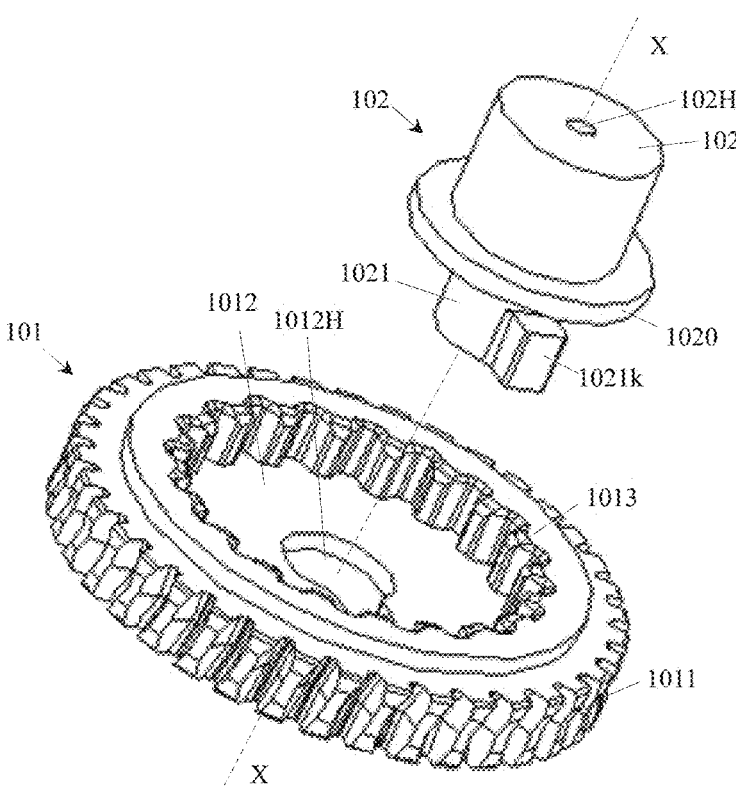
FIGS. 3A and 3B are a top perspective view and a bottom perspective view of a switch assembly used in the composite driving mechanism shown in FIG. 1, respectively.
Figure 3B:
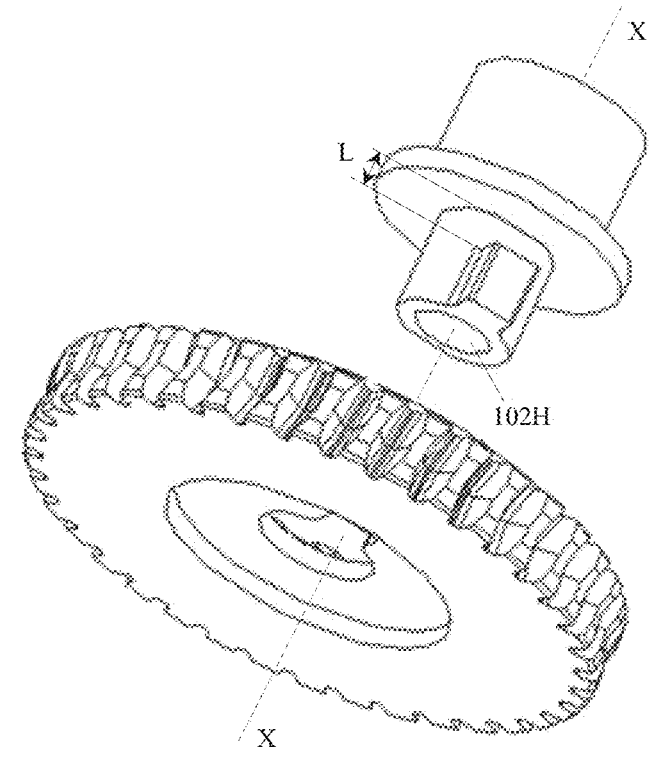

The switch assembly 100 generally includes a ring gear 101 and a transmission member 102. Referring to FIGS. 2, 3A and 3B, the ring gear 101 is provided with a plurality of external teeth 1011 on its outer peripheral wall, which are used to engage with the threads MT on the drive shaft MS of the drive device M so as to receive a driving force from the drive device M. In other words, the ring gear 101 can rotate around the common axis X-X under the driving force from the drive device M via the engagements of the plurality of external teeth 1011 with the threads MT.

The ring gear 101 is also provided with a partition wall 1012 extending perpendicularly to the common axis X-X and dividing an internal space of the ring gear 101 into two spaces. In one of the two spaces (i.e., an upper space shown in FIGS. 3A and 3B), a plurality of internal teeth 1013 protruding inward are provided on an inner peripheral wall of the ring gear 101. The plurality of internal teeth 1013 extend parallelly to the common axis X-X such that a tooth groove extending parallelly to the common axis X-X is defined between every two adjacent internal teeth 1013, to engage with a cinching drive tooth of the cinching drive assembly. The other of the two spaces is used to receive a part of the lifting drive assembly 200 (which will be described in detail below).

A central matching through-hole 1012H is provided through the partition wall 1012. As an example, the central matching through-hole 1012H is provided with a keyway (not labeled) for matching with the transmission member 102 to transmit the driving force from the drive device M to the transmission member 102. Although the partition wall 1012 is depicted in FIGS. 3A and 3B as dividing the internal space of the ring gear 101 into two spaces, the partition wall can be alternatively set to be flush with one axial side of the ring gear 101 (such as the axial side shown in FIG. 3B).

Figures 6, 7:
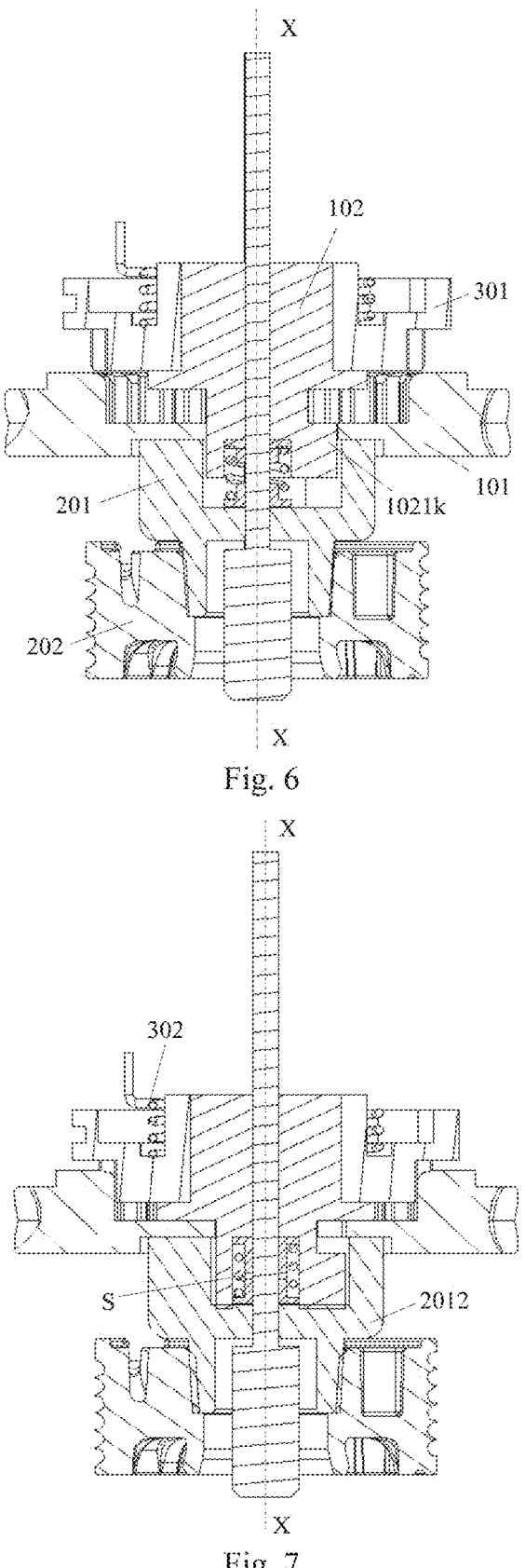
FIGS. 6 and 7 are partial cross-sectional views taken along section A-A of the composite driving mechanism shown in FIG. 1 in a (window) lifting drive mode and a cinching drive mode, respectively, with several components omitted to clearly illustrate engagements among the switch assembly, the cinching drive assembly, and the lifting drive assembly.

The transmission member 102 is substantially cylindrical in shape and provided with a central transmission through-hole 102H for allowing the positioning member P to extend therethrough. The central transmission through-hole 102H is in the form of a stepped hole (see FIGS. 6 and 7) to receive an elastic member S (as shown in FIGS. 2, 6 and 7, and its function will be described in detail below). The transmission member 102 is equipped with a retaining ring 1020, which extends radially outward from an outer peripheral wall of the transmission member 102 away from the common axis X-X, thereby dividing the transmission member 102 into a first rod portion 1021 to be assembled on the ring gear 101 and a second rod portion 1022 positioned away from the ring gear 101. Although an outer diameter of the first rod portion 1021 is shown in FIGS. 3A and 3B to be smaller than that of the second rod portion 1022, the present invention is not limited thereto and the former one can also be smaller than or equal to the latter.

A connecting key 1021$k$ in the form of a protrusion is provided on an outer peripheral wall of the first rod portion 1021 and extends radially outward from the outer peripheral wall of the first rod portion 1021 away from the common axis X-X. The connection key 1021$k$ is configured to have an axial length such that it allows to simultaneously mate with a keyway of the central matching through-hole 1012H and the lifting drive assembly (which will be described in detail below). There is an axial distance L between the retaining ring 1020 and an axial side of the connecting key 1021$k$ in proximity to the retaining ring 1020, the axial distance Lis configured to allow the transmission member 102 to disengage from the central matching through-hole 1012H of the ring gear 101 by being moved along the common axis X-X such that the transmission member 102 is prevented from receiving the driving force transmitted by the ring gear 101 from the drive device M.

Although the first rod portion 1021 is shown in FIGS. 3A and 3B as having a connecting key and the central matching through-hole 1012H as having a matching keyway, the skilled person in the art can envisage instead providing an alternative keyway on the first rod portion 1021 and a matching connecting key on the central matching through-hole. For example, the alternative keyway includes a circumferential groove located on the first rod portion 1021 in proximity to the retaining ring 1020 and an axial groove extending parallelly to the common axis X-X on the outer peripheral wall of the first rod portion 1021.

Figure 4:
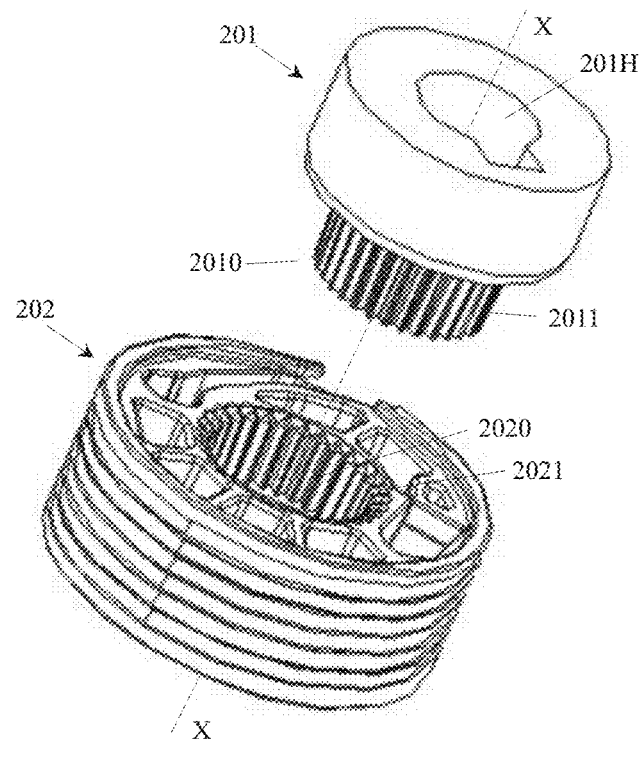
FIG. 4 is a top exploded perspective view of a lifting drive assembly used in the composite driving mechanism shown in FIG. 1.

Referring to FIGS. 2 and 4, the lifting drive assembly 200 includes a lifting drive member 201 and a sleeve 202. The lifting drive member 201 is substantially cylindrical in shape and arranged with a central lifting through-hole 201H for receiving the first rod portion 1021 of the transmission member 102 and allowing the positioning member P to pass therethrough. A configuration of the central lifting through-hole 201H is substantially the same as that of the central matching through-hole 1012H of the ring gear 101, and also in the form of a stepped hole. FIGS. 6 and 7 show an example of a section A-A of the stepped hole. The stepped hole has a section with a reduced diameter arranged therein to receive the positioning member P.

A lifting teeth portion 2010 is arranged on an axial end of the lifting drive member 201 away from the ring gear 101. An outer peripheral wall of the lifting teeth portion 2010 has lifting drive teeth 2011 provided thereon for matching with the sleeve 202. Although an outer diameter of the lifting teeth portion 2010 of the lifting drive member 201 is shown in FIG. 4 to be smaller than that of the rest of the lifting drive member 201, thereby forming a shoulder 2012 (indicated in FIG. 7), the present invention is not limited thereto. Alternatively, the outer diameter of the lifting teeth portion 2010 can also be equal to or greater than that of the rest.

The sleeve 202 is a conventional component in an existing window lifting mechanism, and therefore a specific description of its structures is omitted in the present invention. It should be mentioned that the sleeve 202 has a receiving groove 2020 provided therein for receiving the lifting teeth portion 2010. The receiving groove 2020 is provided with engaging teeth 2021 on an inner peripheral wall thereof to engage with the lifting drive teeth 2011, so as to transmit the driving force from the drive device M to the window lifting mechanism via an engagement of the lifting drive teeth 2011 with the engaging teeth 2021, thereby achieving the window lifting function. In consideration that the specific structure of the window lifting mechanism is well-known in the field, the specific description of its structures will be omitted in the present invention.

Preferably, an axial length of the lifting teeth portion 2010 is equal to or slightly greater than that (i.e., a depth) of the receiving groove 2020, as shown in FIGS. 6 and 7 such that when they are engaged (i.e., the lifting teeth portion 2010 is received within the receiving groove 2020, as shown in FIGS. 6 and 7), in the case that the lifting drive member 201 is provided with a shoulder, the axial side of the sleeve 202 abuts against the shoulder 2012 or separated from each other by an axial distance (as shown in FIGS. 6 and 7).

As shown in FIGS. 2, 6 and 7, an elastic member S, such as a coil spring, is provided between the transmission member 102 and the lifting drive member 201 such that there is always an axial elastic force pointing along the common axis X-X between them. A preload is applied to the transmission member 201 due to the presence of the axial elastic force such that the transmission member 201 is always in a state in which the transmission member 201 abuts axially against the cinching drive assembly 300. The elastic member S has an end provided in the central transmission through-hole 102H of the transmission member 102, and the other end provided in the central lifting through-hole 201H of the lifting drive member 201.

Figure 5A:
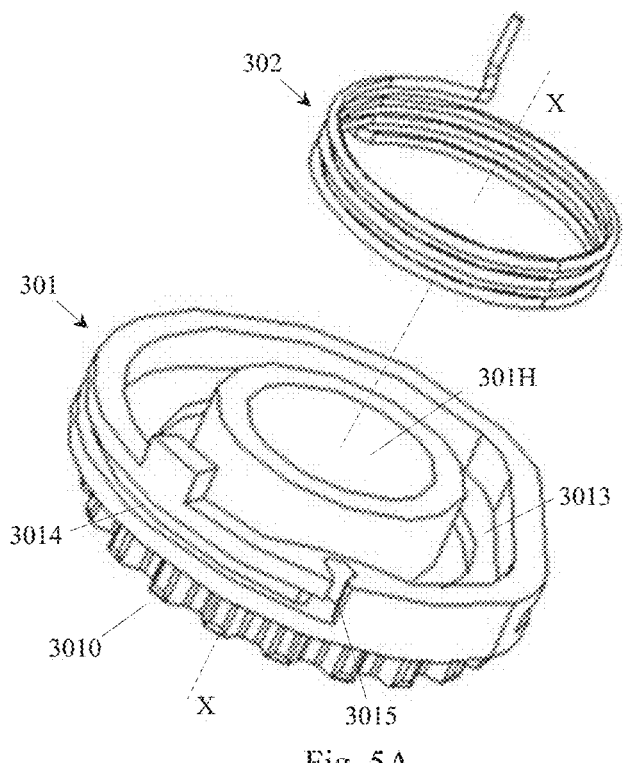
FIGS. 5A and 5B are a top exploded perspective view and a bottom exploded perspective view of the cinching drive assembly used in the composite driving mechanism shown in FIG. 1, respectively.
Figure 5B:
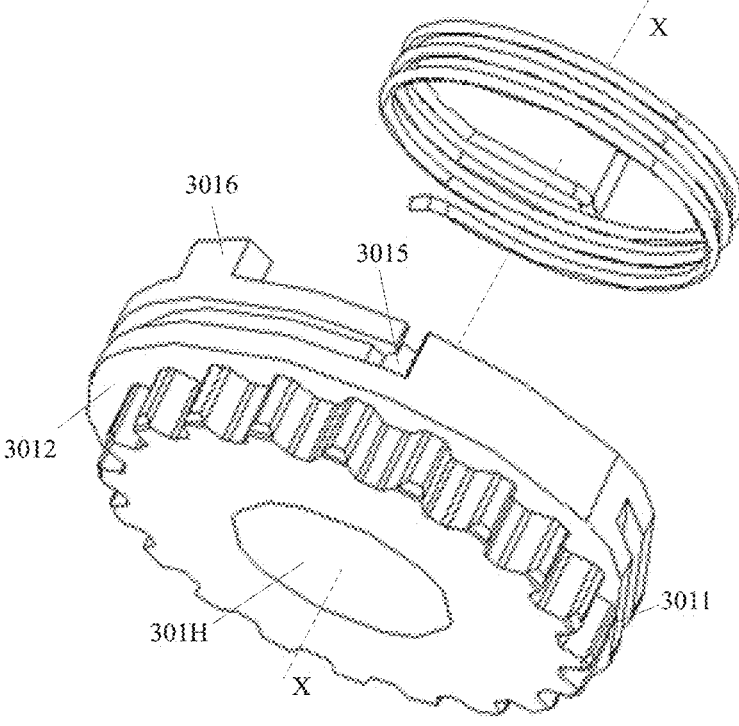

Referring to FIGS. 5A and 5B, the cinching drive assembly 300 generally includes a cinching drive member 301 and a reset elastic member 302. The cinching drive member 301 is provided with a central cinching through-hole 301H, which extends through the cinching drive member 301 along the common axis X-X and is configured to allow the second rod portion 1022 of the transmission member 102 to pass therethrough such that the cinching drive member 301 can abut axially against the retaining ring 1020 of the transmission member 102. A first axial end of the cinching drive member 301, which abuts against the retaining ring 1020, is provided with a cinching teeth portion 3010. An outer peripheral wall of the cinching teeth portion 3010 is provided with a plurality of cinching drive teeth 3011 configured to engage with a plurality of internal teeth 1013 of the ring gear 101 to receive the driving force from the drive device M. As shown in FIGS. 5A and 5B, an outer diameter of the cinching teeth 3010 is slightly smaller than that of the cinching drive member 301, thereby forming a shoulder 3012 (indicated in FIG. 5B). The shoulder 3012 can be configured to abut against the axial end of the ring gear 301 when the plurality of cinching drive teeth 3011 engage with the plurality of internal teeth 1013, but the present invention is not limited thereto. When the axial length of the cinching drive tooth 3011 is greater than that of the internal tooth 1013, the above-mentioned abutment may not occur.

On a second axial end of the cinching drive member 301 opposite to the first axial end, there is an annular recess 3013 provided around the central cinching through-hole 301H. The annular recess 3013 is recessed along the common axis X-X relative to the axial side of the second axial end of the cinching drive member 301 to receive the reset elastic member 302. Although the annular recess 3013 is shown in FIG. 5A as having an inner peripheral wall, in alternative embodiments, the inner peripheral wall may be omitted. In other words, in an assembled state, the reset elastic member 302 can be directly fitted onto the second rod portion 1022, rather than being fitted, as shown, onto the inner peripheral wall of the annular recess 3013.

A circumferential groove 3014 is provided on an outer peripheral wall of the cinching drive member 301 and runs along a circumferential direction of the cinching drive member 301 to receive a flexible connecting member such as a tether (not shown). A circumferential length of the circumferential groove 3014 may be equal to that of the cinching drive member 301 (i.e., its circumference). Preferably, the circumferential length of the circumferential groove 3014 can be at least ¾ of that of the cinching drive member 301, as shown in FIGS. 5A and 5B. Of course, the skilled person in the art can select the circumference length of the circumferential groove 3014 on actual demands. The flexible connecting member is positioned in the circumferential groove 3014, and has an end fixedly connected to a receiving portion 3015 of the cinching drive member 301. The receiving portion 3015 is shown in FIGS. 5A and 5B as being located at one end of the circumferential groove 3014 and in the form of a receiving recess, but the present invention is not limited thereto. The flexible connecting member has the other end passing through a housing 500 (only a part of which is shown in FIG. 2) and connected to the existing door cinching mechanism. Since connection structures between the flexible connecting member and the door cinching mechanism are well-known in the field, the specific description thereof will be omitted in the present invention.

The cinching drive member 301 is also provided with a stop 3016 extending from the outer peripheral wall of the annular recess 3013 in a direction parallel to the common axis X-X at the second axial end of the cinching drive member 301. The stop 3016 is configured to abut against the stop matching portion 501 (indicated in FIG. 2) provided on the housing 500. The stop matching portion 501 may be in the form of a protrusion protruding from the inner wall of the housing 500 towards the inner side thereof. As known by the skilled person in the art, the stop matching portion can be in any suitable form envisagable by the skilled person in the art.

The arrangement of the reset elastic member 302 aims to tend to keep the cinching drive member 301 in its initial radial position. In the initial radial position, the stop 3016 of the cinching drive member 301 abuts against the stop matching portion 501 on the housing 500, and the flexible connecting member arranged in the circumferential groove 3014 is in a critical state. Among them, the critical state refers to the state in which the flexible connecting member is just tightened but experiences no tensile force along its extension direction.

The reset elastic member 302 can be, for example, in the form of a torsion spring, but the present invention is not limited thereto. The reset elastic member 302 has an end (located away from the cinching teeth portion 3010 and) fixed to the housing 500, and the other end (located near the cinching teeth portion 3010 and) fixedly connected to the cinching drive member 301 (for example, within the annular recess 3013).

Now back to FIG. 2, it can be seen therefrom that the positioning member P passes through the corresponding central through-holes of the lifting drive assembly 200, the switch assembly 100 and the cinching drive assembly 300 in sequence, thereby assembling them coaxially together, and pressing them against each other via the reset elastic member 302 of the cinching drive assembly 300. In addition, as shown in the figure, the switch assembly 100 (especially the ring gear 101 thereof) is located between the lifting drive assembly 200 and the cinching drive assembly 300, and separates them from each other.

The operating principle of the composite driving mechanism 8000 according to the present invention in different operating modes will be described below with reference to FIGS. 6 and 7.

FIG. 6 is a partial cross-sectional view of a composite driving mechanism 8000, taken along a section A-A shown in FIG. 1, according to the present invention in a (window) lifting drive mode. A plurality of components (such as the drive device, switching drive assembly, etc.) are omitted in the figure so as to illustrate more clearly the matching relations between the switch assembly, the cinching drive assembly and the lifting drive assembly in this mode.

As shown in FIGS. 1, 2 and 6, (threads MT on) the drive shaft MS of the drive device M engage(s) with (outer teeth 1011 of) the ring gear 101 of the switch assembly 100, thereby providing the driving force for driving the ring gear 101 to rotate around the common axis X-X. When the switch assembly 100 is in a lifting drive position, the transmission member 102 in the switch assembly 100 simultaneously engages with the keyway of the central matching through-hole 1012H of the ring gear 101 and the keyway of the central lifting through-hole 201H of the lifting drive member 201 via its connecting key 1021k, thereby transmitting the driving force from the ring gear 101 to the lifting drive member 201 via the transmission member 102. The lifting drive member 201 transmits the driving force from the ring gear 101 to the window lifting mechanism via the engagement of the lifting drive teeth 2011 of its lifting teeth portion 2010 with the engagement teeth 2021 of the sleeve 202, thereby achieving the window lifting function.

It should be noted that in this mode, the cinching drive member 301 of the cinching drive assembly 300 does not engage with the internal teeth 1013 of the ring gear 101 of the switching assembly 100, and therefore cannot receive the driving force from the drive device M. In other words, in this mode, the cinching drive assembly 300 is in a(n) standby (invalid) state. At this time, the cinching drive member 301 is in its initial radial position under the action of the reset elastic member 302 such that the flexible connecting member provided within the circumferential groove 3014 of the cinching drive member 301 is in a critical state, and the stop 3016 abuts against the stop matching portion 501 on the housing 500.

The switching of the composite drive assembly 8000 according to the present invention from the lifting drive mode to the cinching drive mode can be achieved by moving the switch assembly 101 from the lifting drive position to a cinching drive position along the common axis X-X.

FIG. 7 is a view similar to FIG. 6, which is a partial cross-sectional view, taken along the section A-A shown in FIG. 1, of the composite driving mechanism 8000 according to the present invention in the cinching drive mode.

As described above, the drive device M provides a driving force to drive the ring gear 101 to rotate around the common axis X-X. When the switch assembly 100 (specifically, its transmission member 102) moves axially along the common axis X-X from the lifting drive position shown in FIG. 6 to the cinching drive position shown in FIG. 7, the connecting key 1021k of the transmission member 102 in the switch assembly 100 disengages from the keyway of the central matching through-hole 1012H of the ring gear 101 due to this axial movement, thereby only maintaining the matching relation with the keyway of the central lifting through-hole 201H of the lifting drive member 201. As a result, the driving force cannot be transmitted from the ring gear 101 to the lifting drive member 201. Therefore, in the cinching drive mode, the lifting drive assembly 200 is in a(n) standby (invalid) state, since it is unable to transmit the driving force from the drive device M to the lifting drive assembly 200.

In the cinching drive mode, due to the axial movement of the transmission member 102 and an axial biasing force from the reset elastic member 302, the cinching drive member 301 also moves axially such that the cinching drive teeth 3011 of the cinching drive member 301 engage with the internal teeth 1013 of the ring gear 101. In this way, the driving force from the drive device M is transmitted to the cinching drive assembly 300 via the ring gear 101. The cinching drive member 301 in its initial radial position is rotated via the engagement of the cinching drive teeth 3011 with the internal teeth 1013 of the ring gear 101, thereby pulling the flexible connecting member provided in the critical state in the circumferential groove 3014 of the cinching drive member 301, further tightening it to drive the vehicle's cinching mechanism, and thus achieving the cinching function. At this time, the stop 3016 disengages from the stop matching portion 501. Once the cinching function is achieved, the drive device M reverses, thereby resetting the cinching drive member 301 to its initial radial position via the ring gear 101 such that the flexible connecting member returns to its critical state, and the stop 3016 and the stop matching portion 501 return to abut against each other. It can be seen that, the arrangement of the abutment is intended to keep the flexible connecting member in a taut state all the time, thereby preventing it from being relaxed, but being allowed to be switched between being under force (the cinching function being activated) and not under force (standby state).

As described above, the mode switching between the lifting drive mode shown in FIG. 6 and the cinching drive mode shown in FIG. 7 of the composite driving mechanism 8000 according to the present invention can be achieved by switching the position of the transmission member 102 of the switch assembly 101 between the lifting drive position and the cinching drive position. The above position switching is achieved by switching the driving mechanism.

A switching drive mechanism used in the composite driving mechanism 8000 according to the present invention will be described below with reference to FIGS. 8A and 8B.

Figure 8A:
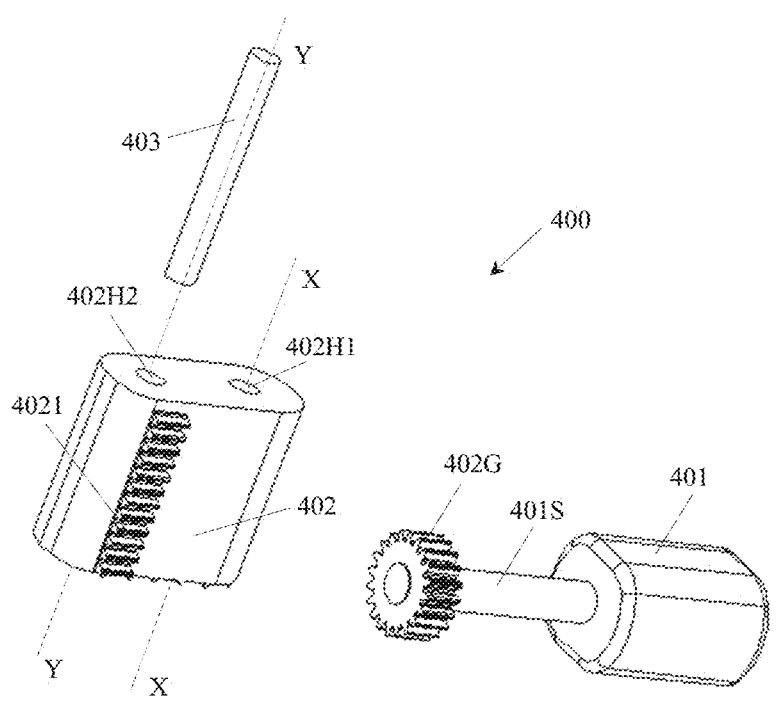
FIGS. 8A and 8B show a top exploded view and an assembly perspective view of the cinching drive assembly used in the composite driving mechanism shown in FIG. 1, respectively.
Figure 8B:
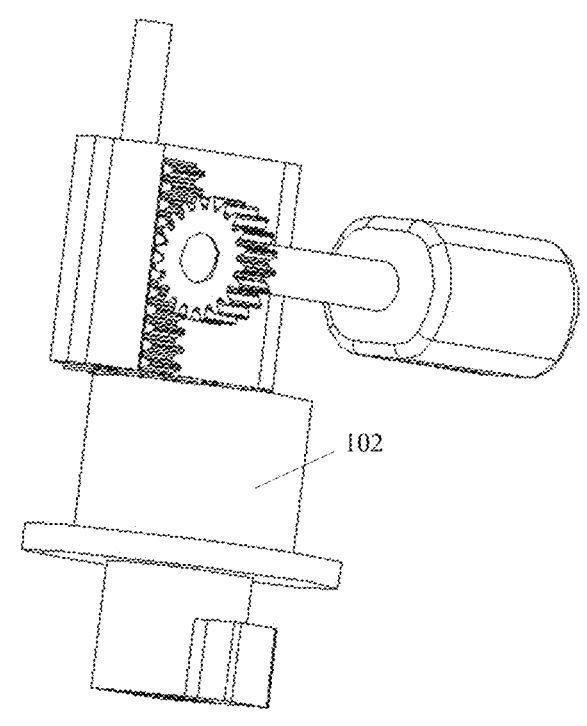

FIGS. 8A and 8B are a top exploded view and an assembly perspective view of an embodiment of the switching drive mechanism described above, respectively.

The switching drive assembly 400 includes a switching drive device 401 and a switching drive member 402. The switching drive device 401 is similar to the drive device M, and includes a switching drive shaft 401S extending from one side thereof and a spur gear 401G provided on the switching drive shaft 401S and capable to rotate along with the rotation of the switching drive shaft 401S.

The switching drive member 402 is provided with an assembly positioning through-hole 402H1, which extends along the common axis X-X through the switching drive member 402 and is used to receive the positioning member P so as to achieve its assembly in the composite drive mechanism 8000. The switching drive member 402 also includes a translation through-hole 402H2 extending along a biasing axis Y-Y parallel to the common axis X-X and used to be fitted onto a positioning column 403 fixed to the housing 500, thereby allowing the switching drive member 402 to move axially along the positioning column 403 (i.e., along the biasing axis Y-Y or parallelly to the common axis X-X). The side of the switching drive member 402 facing the switching assembly 100 abuts against the axial side of the second rod portion 1022 of the transmission member 102, as shown in FIG. 8B. The switching drive member 402 is provided, on the side thereof facing the spur gear 401G, with engagement teeth 4021 configured to engage with the teeth of the spur gear 401G such that the switching drive member 402 can move axially along the biasing axis Y-Y via the matching (the teeth engagement) between (the teeth of) the spur gear 401G and (the engagement teeth 4021 of) the switching drive member 402 under the drive action of the switching drive device 401, and then bias the transmission member 102 to move axially along the common axis X-X, thereby achieving the position switching (of the transmission member 102) of the switch assembly 100.

When the switching drive device 401 rotates in the opposite direction, the transmission member 102 can move in the opposite direction under the action of the axial elastic force from the elastic member S.

The operation of the switching drive device 401 can be activated by receiving a start signal, which may be manually provided by a driver (such as operating buttons, etc.), or automatically provided by a vehicle CPU when the vehicle needs to implement the cinching function. The present invention will not provide further explanation in this regard.

Figures 9A, 9B:
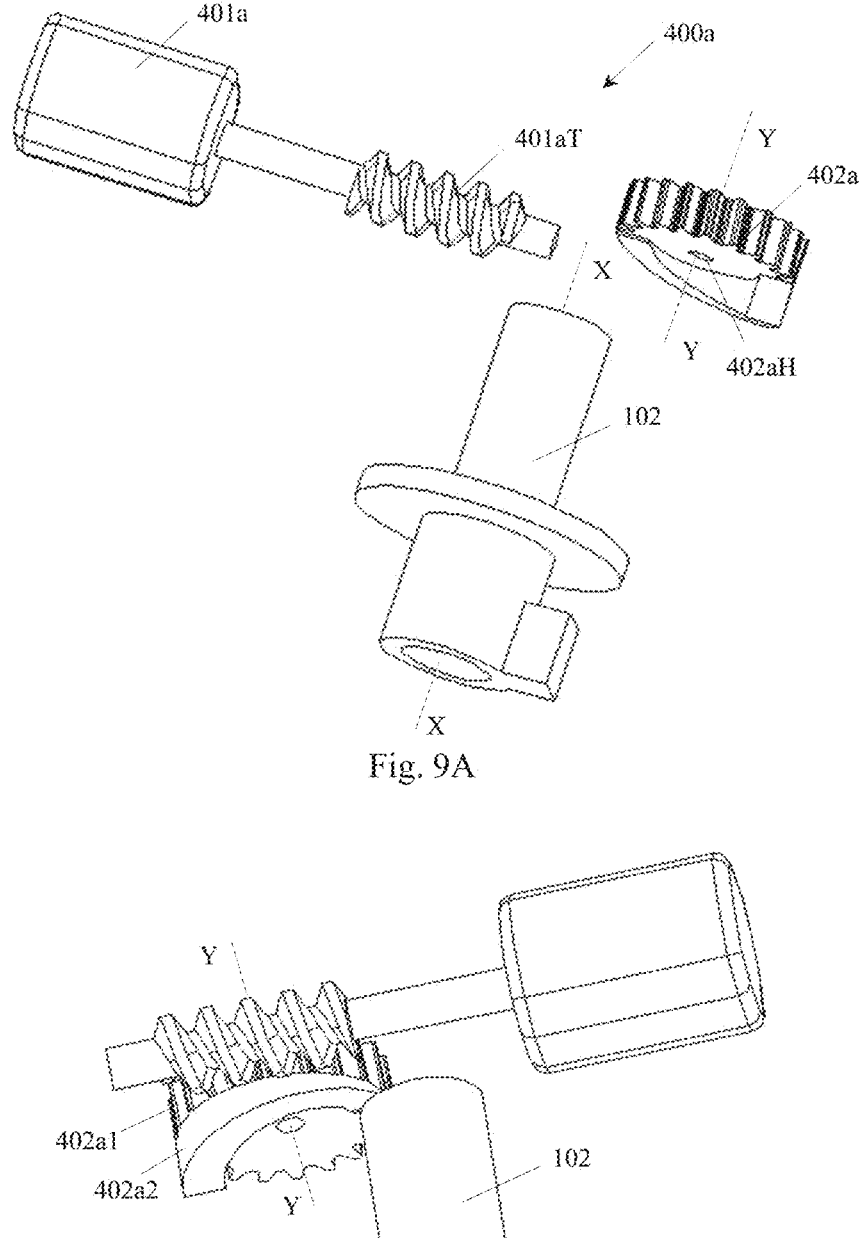
FIGS. 9A and 9B show a bottom exploded view and an assembly perspective view of an alternative structure of the cinching drive assembly shown in FIGS. 8A and 8B, respectively.

FIGS. 9A and 9B show exploded and assembled perspective views of alternative embodiments of the switching drive mechanism described above, respectively.

The switching drive assembly 400a shown in FIGS. 9A and 9B also includes a switching drive device 401a and a switching drive member 402a. The difference between the switching drive device 401a and the switching drive device 401 shown in FIGS. 8A and 8B is that the drive shaft of the switching drive device 401a is provided with threads 401aT, instead of the spur gear 401G. The switching drive member 402a includes a gear portion 402a1, and an outer peripheral wall of the gear portion 402a1 is provided with teeth to engage with the threads 401aT on the switching drive device 401a. The gear portion 402a1 is provided with a central positioning through-hole 402aH, which extends through the switching drive member 402a along the aforementioned offset axis Y-Y and is used to receive, for example, the aforementioned positioning column 403. Thus, the gear portion 402a1 can rotate around the positioning column (in other words, the offset axis Y-Y) under the driving action of the switching drive device 401a. Although not shown in the figure, it is preferred that an upper surface of the gear portion 402a1 (i.e. the surface facing away from the transmission member 102) abuts against the housing 500 to provide an axial support force to the gear portion 402a1.

The switching drive member 402a also includes a cam portion 402a2, which is fixedly attached to the side of the gear portion 402a1 facing the transmission member 102, or integral with the gear portion 402a1. The cam portion 402a2 is provided with a chamfered surface configured to abut against the axial side of the second rod portion 1022 of the transmission member 102. Thus, as the switching drive member 402 rotates around the biasing axis Y-Y under the action of the switching drive device 401a, the axial side of the transmission member 102 can be allowed to slide along the chamfered surface under the action thereof, thereby moving axially along the common axis X-X so as to achieve the aforementioned position switching.

Although FIGS. 9A and 9B depict the cam portion 402a2 to be only connected to a portion of the gear portion 402a1, the cam portion may also be connected to an entire side of the gear portion 402a1 (for example, in the form of a cylindrical body with a slanted cross-section and facing the transmission member 102). Similarly, the skilled person in the art can conceive of various suitable structures which may achieve the above functions.

Although not shown in the figure, the housing 500 is configured to accommodate the drive device M, the switch assembly 100, at least a portion of the lifting drive assembly 200 and the cinching drive assembly 300, wherein only the flexible connecting member penetrates the housing 500 to connect the cinching drive assembly 300 located inside the housing 500 with the cinching mechanism located outside the housing 500, and the sleeve 202 of the lifting drive assembly 200 is exposed on the lower side of the housing shown in FIG. 1 to match with the lifting mechanism of the vehicle.

Although several embodiments of the present invention have been described with reference to the accompanying drawings, as understood by the skilled person in the art, various improvements can be made to the above embodiments without departing from the scope defined by the following claims. The above embodiments are provided only as examples to illustrate the technical solution of the present invention, and are not intended to limit the scope of protection thereof. The features or elements described in one embodiment may be combined into another one, unless they contradict with existing features or elements in the latter.

What is claimed is:

1. A composite drive mechanism for a vehicle, comprising:

a drive device configured to provide a driving force;

a lifting drive assembly configured to transmit the driving force to a lifting mechanism of the vehicle to achieve a lifting function of a window of the vehicle;

a cinching drive assembly configured to transmit the driving force to a cinching mechanism of the vehicle to achieve a cinching function of a door of the vehicle; and a switch assembly configured to engage with the drive device and capable to be selectively switched between a lifting drive position, in which the switch assembly only transmits the driving force to the lifting drive assembly, and a cinching drive position, in which the switch assembly only transmits the driving force to the cinching drive assembly;

wherein the switch assembly is located between the lifting drive assembly and the cinching drive assembly and separates them from each other;

wherein the lifting drive assembly, the cinching drive assembly and the switch assembly are axially connected via a positioning member such that the switch assembly, the lifting drive assembly and the cinching drive assembly can rotate around a common axis along which the positioning member is positioned; and wherein the switch assembly comprises:

a ring gear comprising a partition wall extending perpendicularly to the common axis and provided with a central matching through-hole; and a transmission member provided through the central matching through-hole and capable to move axially along the common axis under the action of the switching drive assembly.

2. The composite driving mechanism of claim 1, wherein the ring gear further comprises:

a plurality of external teeth provided on an outer peripheral wall of the ring gear and configured to engage with threads on a drive shaft of the drive device such that the ring gear can rotate around the common axis under the action of the driving force; and a plurality of internal teeth provided on an inner peripheral wall of the ring gear located on a side of the partition wall, and configured to engage with the cinching drive assembly;

wherein when the switch assembly is in the lifting drive position, the transmission member can simultaneously engage with the ring gear and the lifting drive assembly to transmit the driving force to the lifting drive assembly via a rotation of the ring gear, and when the switch assembly is in the cinching drive position, the transmission member can be disengaged from the ring gear and thus cannot receive a power transmission from the ring gear.

3. The composite driving mechanism of claim 2, wherein the partition wall is flush with an axial side of the ring gear; or the partition wall divides an internal space of the ring gear into a first space and a second space, and the plurality of internal teeth are arranged in one of the first space and the second space, while the other of the first space and the second space is configured to receive a portion of the lifting drive assembly.

4. The composite driving mechanism of claim 2, wherein the transmission member comprises a retaining ring extending radially outward from an outer surface of the transmission member and perpendicularly to the common axis, thereby dividing the transmission member into a first rod portion and a second rod portion;

wherein the first rod portion is configured to pass through the central matching through-hole of the ring gear, and a connection structure extending radially outward and away from the common axis is provided on an outer peripheral wall of the first rod portion at an end thereof away from the ring gear and is configured to engage with a matching structure provided at the central matching through-hole, the connection structure has an axial length sufficient to enable the first rod portion to simultaneously engage with the central matching through-hole and the lifting drive assembly when the switch assembly is in the lifting drive position, and the connection structure is separated from the ring gear by an axial distance sized such that when the switch assembly is in the cinching drive position, the connecting structure and the matching structure are disengaged from each other.

5. The composite driving mechanism of claim 4, wherein the connecting structure is one of a connecting key and a matching keyway, and the matching structure is the other of the connecting key and the matching keyway.

6. The composite driving mechanism of claim 4, further comprising a housing configured to accommodate the drive device, the switch assembly, at least a portion of the lifting drive assembly and the cinching drive assembly.

7. The composite driving mechanism of claim 6, wherein the switching drive assembly comprises:

a switching drive device fixed relative to the housing, wherein a switching drive shaft of the switching drive device is provided with drive teeth; and a switching drive member configured to axially abut against the second rod portion of the transmission member and provided with:

a translation through-hole extending along a biasing axis, parallel to the common axis, of the switching drive member, and the switching drive member configured to be capable to move axially along a positioning column via the translation through-hole to fit on the positioning column, the positioning column being fixed relative to the housing and extending along the biasing axis;

engagement teeth provided on a side of the switching drive member and configured to engage with the drive teeth of the switching drive device such that the switching drive member can move axially along the common axis under the action of the switching drive device, and then drive the transmission member to move axially; and an assembly for positioning through-hole configured to allow the positioning member to pass through to achieve an assembly positioning.

8. The composite driving mechanism of claim 6, wherein the switching drive assembly comprises:

a switching drive device fixed relative to the housing, driving threads being provided on a switching drive shaft of the switching drive device; and a switching drive member comprising:

a gear portion provided with a central positioning hole, which extends along a biasing axis parallel to the common axis and is fit on a positioning column fixed relative to the housing and extending along the biasing axis, transmission teeth being provided on an outer peripheral wall of the gear portion and configured to engage with the driving threads of the switching drive device such that the switching drive member can rotate around the positioning column under the driving action of the switching drive device; and a cam portion connected to or integral with the gear portion along the biasing axis, a chamfered surface being provided on a side of the cam portion away from the gear portion and configured to abut against an axial side of the transmission member such that the axial side can slide on the chamfered surface when the switching drive member rotates, thereby achieving the axial movement of the transmission member along the biasing axis.

9. The composite driving mechanism of claim 6, wherein the lifting drive assembly comprises:

a lifting drive member comprising:

a central lifting through-hole extending through the lifting drive member along the common axis and configured to receive and engage with the first rod portion to receive the driving force transmitted via the ring gear;

a lifting teeth portion provided on an end of the lifting drive member away from the ring gear, lifting drive teeth being provided on an outer peripheral wall of the lifting teeth portion and used for engaging with a window lifting mechanism of the vehicle to transmit the driving force from the ring gear; and a sleeve provided with a receiving groove configured to receive the lifting teeth portion such that receiving teeth provided on an inner peripheral wall of the receiving groove can engage with lifting drive teeth on the lifting teeth portion, and the sleeve is configured to match with the window lifting mechanism to transmit the driving force from the drive device to the window lifting mechanism.

10. The composite driving mechanism of claim 9, wherein the central lifting through-hole is provided with a matching structure which is the same as that of the central matching through-hole; and/or the lifting teeth portion has an axial length not less than that of the receiving groove of the sleeve to which the lifting teeth portion is to be matched.

11. The composite driving mechanism of claim 10, wherein an elastic member is provided between the first rod portion and the lifting drive member to provide an elastic force directed along the common axis between them.

12. The composite driving mechanism of claim 11, wherein the central lifting through-hole of the lifting drive member is a stepped hole, and the transmission member is provided with a central transmission through-hole also in the form of a stepped hole, the elastic member has an end provided in the central transmission through-hole and the other end provided in the central lifting through-hole.

13. The composite driving mechanism of claim 6, wherein the cinching drive assembly comprises:

a cinching drive member configured to tend to be remained in an initial radial position relative to the housing under the action of a reset elastic member and to form an axial abutment between the cinching drive member and the transmission member of the switching assembly, and comprising:

a central cinching through-hole provided along the common axis through the cinching drive member, which is configured to be fit on the second rod portion of the transmission member via the central cinching through-hole and axially abut against the retaining ring of the transmission member;

a cinching teeth portion located at a first axial end of the cinching drive member in proximity to the cinching drive member, wherein a plurality of cinching drive teeth are provided on an outer peripheral wall of the cinching teeth portion and configured to engage with the plurality of internal teeth of the ring gear, when the switch assembly is in the cinching drive position, so as to receive the driving force transmitted via the ring gear; and a flexible connecting member having an end fixedly connected to the cinching drive member, and the other end fixedly connected to the cinching mechanism of the vehicle, and when the cinching drive assembly is in the initial radial position, the flexible connecting member is in a critical state.

14. The composite driving mechanism of claim 13, wherein the cinching drive member is further provided with an annular recess arranged around the central cinching through-hole on a second axial end of the cinching drive member opposite to the first axial end; and the reset elastic member is in the form of a torsion spring, and is arranged within the annular recess around the central cinching through-hole, and has an end fixed to the housing, and the other end fixed to the cinching drive member.

15. The composite driving mechanism of claim 14, wherein the cinching drive member is further provided with a stop extending, on the second axial end, parallelly to the common axis from an outer peripheral wall of the annular recess, and configured such that when the cinching drive member is in the initial radial position, a side of the stop along a circumferential direction of the cinching drive member abuts against the housing.

16. The composite driving mechanism of claim 15, wherein the stop abuts against a stop matching portion protruding towards an inner side of the housing and provided on an inner wall of the housing.

17. The composite driving mechanism of claim 13, wherein a circumferential groove is provided on the outer peripheral wall of the cinching drive member and runs along a circumferential direction of the cinching drive member, and the flexible connecting member is provided within the circumferential groove.

18. The composite driving mechanism of claim 17, wherein the circumferential groove has a circumferential length accounting for at least ¾ of the entire circumferential length of the cinching drive assembly.

19. A vehicle comprising:

at least one door each equipped with the composite driving mechanism of claim 1.

\* \* \* \* \*